(No Model.)
J. KNIGHT.
HALTER.
No. 432,414. Patented July 15, 1890.
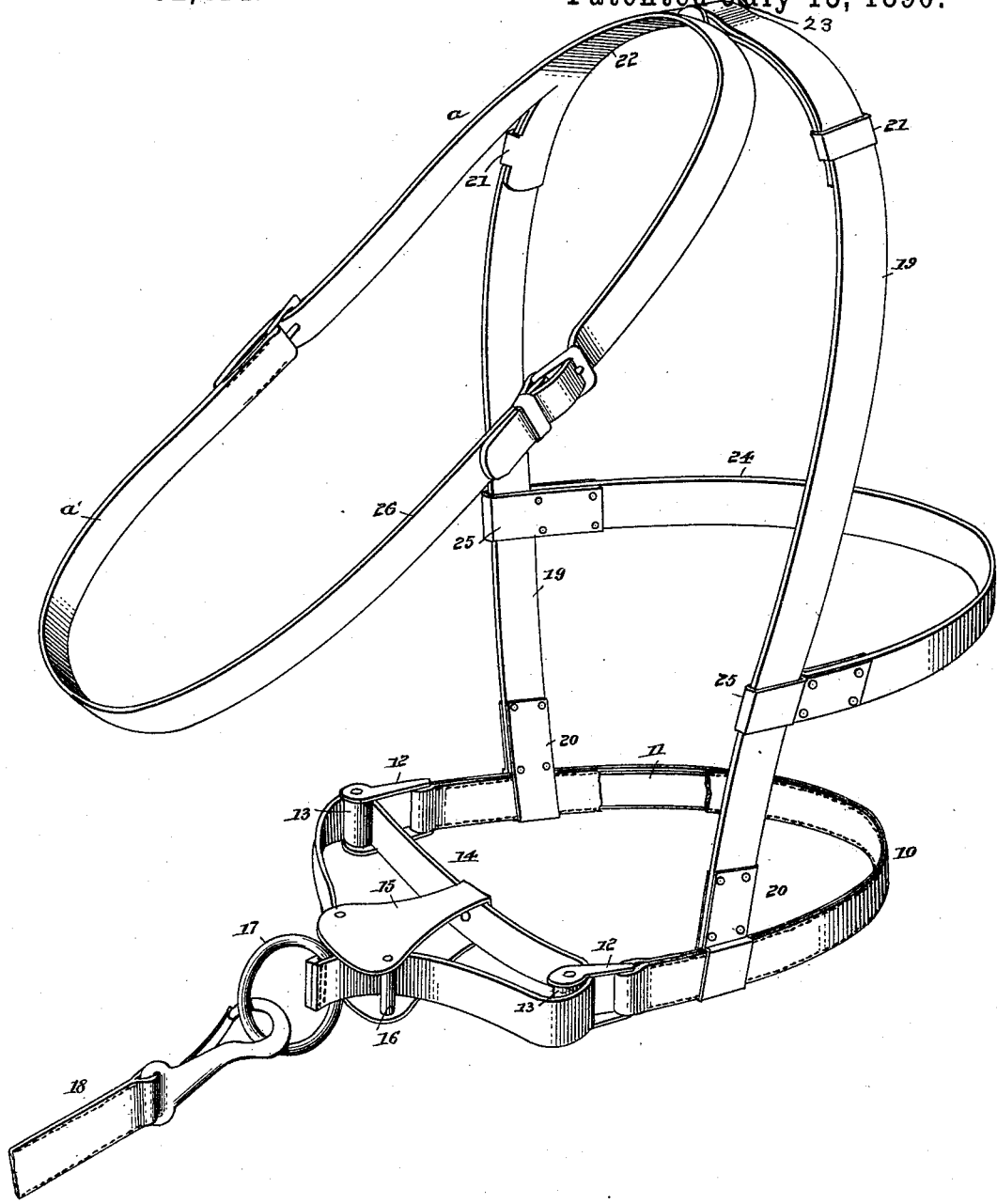
WITNESSES:
INVENTOR:

UNITED STATES PATENT OFFICE.

JOSEPH KNIGHT, OF LIVERMORE FALLS, MAINE.

HALTER.

SPECIFICATION forming part of Letters Patent No. 432,414, dated July 15, 1890.

Application filed November 25, 1889. Serial No. 331,462. (No model.)

*To all whom it may concern:*

Be it known that I, JOSEPH KNIGHT, of Livermore Falls, in the county of Androscoggin and State of Maine, have invented a new and useful Improvement in Halters, of which the following is a full, clear, and exact description.

My invention relates to an improvement in halters, and has for its object to so construct the same that when a horse becomes unruly and pulls against the person leading him or against a post or other support to which the animal may be tied the nose-strap will be instantly tightened in proportion to the force exerted and the movement of the horse checked, as the pressure upon the nose, which is very tender, causes the animal to feel most uncomfortable and even to suffer pain.

A further object of the invention is to provide a means whereby when the animal ceases to pull, the pressure upon the nose will be automatically removed and to provide for the adjustability of the various straps comprising the halter.

The invention consists in the novel construction and combination of the several parts, as will be hereinafter more fully set forth, and pointed out in the claims.

Reference is to be had to the accompanying drawing, forming a part of this specification, in which the figure represents a perspective view of the halter, portions thereof being broken away.

The nose-strap 10 is made of sufficient length to pass around the nose of the animal and come together to within about three and a half or four inches under the chin, and is preferably made to fit closely yet easily upon the animal. The said nose-strap is constructed by attaching two leather straps together, the said straps having interposed between them from end to end a tape-spring 11.

To each extremity of the nose-strap a horizontal yoke 12 is secured, in each of which yokes a vertical friction-roller 13 is journaled. A strap 14 is passed through said yokes 12 in contact with the said pulleys 13, and to the center of the strap 14, between the pulleys, the forward end of a guide-yoke 15 is secured, which yoke is provided at its unattached extremity with a friction-roller 16, journaled at each side, and the extremities of the strap 14, after being passed over the friction-rollers 13 of the nose-strap, are passed through the guide-yoke 15 in contact with the friction-rollers thereon, and the said extremities of the strap 14 are thereupon united, a ring 17 being secured to the united ends. To the said ring 17 the leading-strap 18 of the halter is attached. The cheek-straps 19 are each attached to the nose-strap by means of a metallic sleeve 20, the said sleeves being capable of sliding upon the said nose-strap, and the upper ends of the cheek-straps are connected in any suitable or approved manner. As shown, each is made to pass through loops 21, forming a portion of the crown-strap 22, and over a friction-pulley 23, attached to the upper central portion of the crown-strap. Thus the cheek-straps are connected yet virtually unattached to any strap, with the exception of the nose-strap, whereby the halter may be readily adjusted to the head of any horse. The cheek-straps may, however, be connected and made to slide upon the crown-strap in any other approved manner. The front strap 24 is provided at each end with a sleeve 25, similar to the sleeves 20 of the cheek-straps, and the front strap is adjustable vertically upon the cheek-straps by reason of the latter being passed through the sleeves of the former. The throat-latch 26 is preferably constructed in two sections $a$ and $a'$, the section $a$ forming a portion of the crown-strap and the section $a'$ being buckled to the upper section.

It will be readily observed that as each strap of the halter is adjustable the halter may be expeditiously and neatly fitted to the head of any animal. It is also evident that the tape-spring 11 will normally hold the nose-strap in gentle contact with the nose of the animal; but should the animal draw against the leading-strap 18 the running strap 14 will be drawn through the guide-yoke 15 and will cause the yokes 12 of the nose-strap to closely approach one another, thereby causing the said nose-strap to bind closely and firmly upon the animal's nose. As soon as pressure is removed from the leading-strap 18 the tape-spring 11 automatically acts to again expand the nose-strap and to restore it and the running strap 14 to their normal positions.

Having thus described my invention, I claim as new and desire to secure by Letters Patent—

1. In a halter, the combination, with a spring-controlled nose-strap 10, of a running strap 14, held to slide through the extremities of the nose-strap, and a guide-yoke 15, attached to the running strap between the extremities of the nose-strap, the extremities of the running strap being passed through said yoke and united and adapted for attachment with the leading-strap 18, substantially as shown and described.

2. The combination, with a spring-controlled nose-strap having a guide-roller secured to each extremity, of a running strap contacting with the said guide-rollers and a guide-yoke attached to the running strap between the extremities of the nose-strap, said guide-yoke being provided with friction-rollers at its unattached end, in contact with which rollers the extremities of the running strap are passed and united at the rear of the yoke, substantially as and for the purpose specified.

3. The combination, with a halter having a nose-strap at the lower ends of its cheek-straps, the rear ends of said nose-strap having loops or yokes, of a running strap 14, passing through both loops and provided between the loops with a yoke 15, having pins or rollers 16, between which the connected ends of the strap 14 pass, and a ring 17, secured to the strap where it passes from between said pins or rollers 16, substantially as set forth.

4. In a halter, a head-piece 22, having loops 21, through which the cheek-straps pass, and a central pulley 23, over which said straps pass, and a throat-latch connected with said head-piece, substantially as set forth.

JOSEPH KNIGHT.

Witnesses:
S. S. LOCKLIN,
A. J. LEE.